United States Patent
Ma et al.

Patent Number: 6,151,160
Date of Patent: Nov. 21, 2000

[54] BROADBAND RAMAN PRE-AMPLIFIER FOR WAVELENGTH DIVISION MULTIPLEXED OPTICAL COMMUNICATION SYSTEMS

[75] Inventors: Xiabing Ma, Morganville; Morten Nissov, Holmdel, both of N.J.

[73] Assignee: Tyco Submarine Systems Ltd., Morristown, N.J.

[21] Appl. No.: 09/166,444

[22] Filed: Oct. 5, 1998

[51] Int. Cl.[7] .................................................. H01S 3/00
[52] U.S. Cl. ........................... 359/341; 359/124; 359/334
[58] Field of Search .................................. 359/334, 341, 359/124

[56] References Cited

U.S. PATENT DOCUMENTS

| | | | |
|---|---|---|---|
| 5,452,116 | 9/1995 | Kirkby et al. | 359/124 |
| 5,883,738 | 3/1999 | Oshima et al. | 359/341 |
| 5,905,838 | 5/1999 | Judy et al. | 385/123 |
| 5,959,750 | 9/1999 | Eskildsen et al. | 359/134 |
| 5,978,130 | 11/1999 | Fee et al. | 359/341 |

*Primary Examiner*—Mark Hellner

[57] ABSTRACT

An optical WDM transmission system. The arrangement includes a splitter for dividing a multiplexed optical signal having a prescribed bandwidth into a plurality of distinct sub-bands. The plurality of distinct sub-bands is received by a plurality of output paths, respectively, which direct the sub-bands to respective ones of a plurality of optical amplifiers disposed in the output paths. The optical amplifiers each have a prescribed gain shape across the bandwidth of its respective sub-band. A coupler recombines the distinct sub-bands and couples them onto the optical fiber transmission path. An optical preamplifier is coupled to an input of the splitter. The optical preamplifier is a Raman amplifier having a bandwidth substantially encompassing the prescribed bandwidth of the multiplexed optical signal.

42 Claims, 4 Drawing Sheets

BROADBAND RAMAN PRE-AMPLIFIER FOR WAVELENGTH DIVISION MULTIPLEXED OPTICAL COMMUNICATION SYSTEMS

FIELD OF THE INVENTION

The present invention relates generally to optical communication systems, and more particularly to the design of low-noise, multi-band optical amplifiers.

BACKGROUND OF THE INVENTION

The availability of high performance optical amplifiers such as Raman amplifiers and the erbium-doped fiber amplifier (EDFA) has renewed interest in the use of wavelength division multiplexing (WDM) for optical transmission systems. In a WDM transmission system, two or more optical data carrying channels, each defined by a different carrier wavelength, are combined onto a common path for transmission to a remote receiver. The carrier wavelengths are sufficiently separated so that they do not overlap in the frequency domain. The multiplexed channels are demultiplexed at the receiver in the electrical or optical domain. Demultiplexing in the optical domain requires using frequency-selective components such as optical gratings or bandpass filters. Typically, in a long-haul optical fiber system, the set of wavelength channels would be amplified simultaneously in an optical amplifier based repeater.

One class of optical amplifiers are rare-earth doped optical amplifiers, which use rare-earth ions as a gain medium. The ions are doped in the fiber core and pumped optically to provide gain. The silica fiber core serves as the host medium for the ions. While many different rare-earth ions such as neodymium, praseodymium, ytterbium etc. can be used to provide gain in different portions of the spectrum, erbium-doped fiber amplifiers (EDFAs) have proven to be particularly attractive because they are operable in the spectral region where optical loss in the fiber is minimized. Also, the erbium-doped fiber amplifier is particularly useful because of its ability to amplify multiple wavelength channels without crosstalk penalty.

The gain characteristics of a rare-earth doped optical amplifier depend on the dopants and co-dopants used to make the fiber core, the particular rare-earth ion employed, and the pumping mechanism that is used. These parameters can be controlled to produce optical amplifiers having different gain profiles. FIG. 1 shows the gain of a conventional EDFA as a function of wavelength over a spectral region of about 1525 nm to 1580 nm. This spectral region is one in which the carrier wavelengths are often located. Clearly, the gain undergoes substantial variations over the spectral region. These variations are exacerbated when many different channels are used which extend over a wide bandwidth.

Unequal gain distribution adversely effects the quality of the multiplexed optical signal, particularly in long-haul systems. For example, insufficient gain leads to large signal-to-noise ratio degradations while too much gain can cause nonlinearity induced penalties. Gain equalizers are therefore used in optical amplifier designs to ensure constant gain over the usable wavelength range. When a bandwidth substantially exceeding 45 nm is required, gain equalizers alone cannot provide the desired performance.

One approach for obtaining broadband constant gain involves dividing the multiplexed signal into two or more bands that occupy a narrow portion of the total bandwidth occupied by the original multiplexed signal. Each band is then amplified individually with its own dedicated optical amplifier, which is tailored to provide a relatively flat gain across its respective portion of the bandwidth. Once amplified, the bands are recombined so that the resulting amplified multiplexed signal can continue traveling along the transmission path. One example of this technique employs two EDFAs that provide reasonably uniform gain over wavelengths between 1525–1565 nm, and 1565–1618 nm, respectively.

One problem that arises when the multiplexed signal is divided into different bands is that distribution and insertion losses cause an increase in noise. This loss can increase as the number of bands into which the signal is divided increases. For example, in double-band amplifiers a combination of an optical circulator and a reflecting filter is typically used as the band splitting device. These devices introduce a ~2 dB insertion loss on the low wavelength band and 1 dB insertion loss on the high band.

The effects of insertion and distribution losses may be somewhat mitigated by using a single amplifier to amplify the original multiplexed signal prior to its division into separate bands. That is, a preamplifier may be used to compensate for the losses. However, this is not an entirely satisfactory solution because the preamplifier, of course, will provide optimal gain for only a portion of the bandwidth of the multiplexed signal. As a result, the noise figure for the preamplifier and amplifier combination is still highly effected by losses due to bandsplitting.

SUMMARY OF THE INVENTION

The present invention overcomes the deficiencies of known optical amplifier arrangements by employing a Raman amplifier as a preamplifier. The Raman amplifier amplifies the optical signal before it is split into a plurality of bands that each individually undergo amplification by dedicated optical amplifiers.

In accordance with one aspect of the present invention, an optical amplifier arrangement is provided for use along a transmission path in an optical WDM transmission system. The arrangement includes a splitter for dividing a multiplexed optical signal having a prescribed bandwidth into a plurality of distinct sub-bands. The plurality of distinct sub-bands is received by a plurality of output paths, respectively, which direct the sub-bands to respective ones of a plurality of optical amplifiers disposed in the output paths. The optical amplifiers each have a prescribed gain shape across the bandwidth of its respective sub-band. A coupler recombines the distinct sub-bands and couples them onto the optical fiber transmission path. An optical preamplifier is coupled to an input of the splitter. The optical preamplifier is a Raman amplifier having a bandwidth substantially encompassing the prescribed bandwidth of the multiplexed optical signal.

The optical amplifiers may be rare-earth optical amplifiers, doped with erbium, for example. Alternatively, the optical amplifiers may be Raman amplifiers having either a distributed or lumped configuration. Likewise, the Raman preamplifier may have either a distributed or lumped configuration.

In accordance with another aspect of the invention, a method is provided for amplifying a multiplexed optical signal traveling in an optical fiber transmission path of a WDM optical communication system. The method begins by imparting Raman gain to a multiplexed optical signal at an intermediate point along the transmission path. The multiplexed optical signal has a prescribed bandwidth. The method continues by demultiplexing the optical signal into a plurality of distinct sub-bands after Raman gain is imparted thereto. The plurality of sub-bands are directed onto respective ones of a plurality of optical paths, in which the plurality of sub-bands are amplified. Finally, the distinct sub-bands are recombined and directed back onto the optical fiber transmission path.

DETAILED DESCRIPTION

Figure 1:
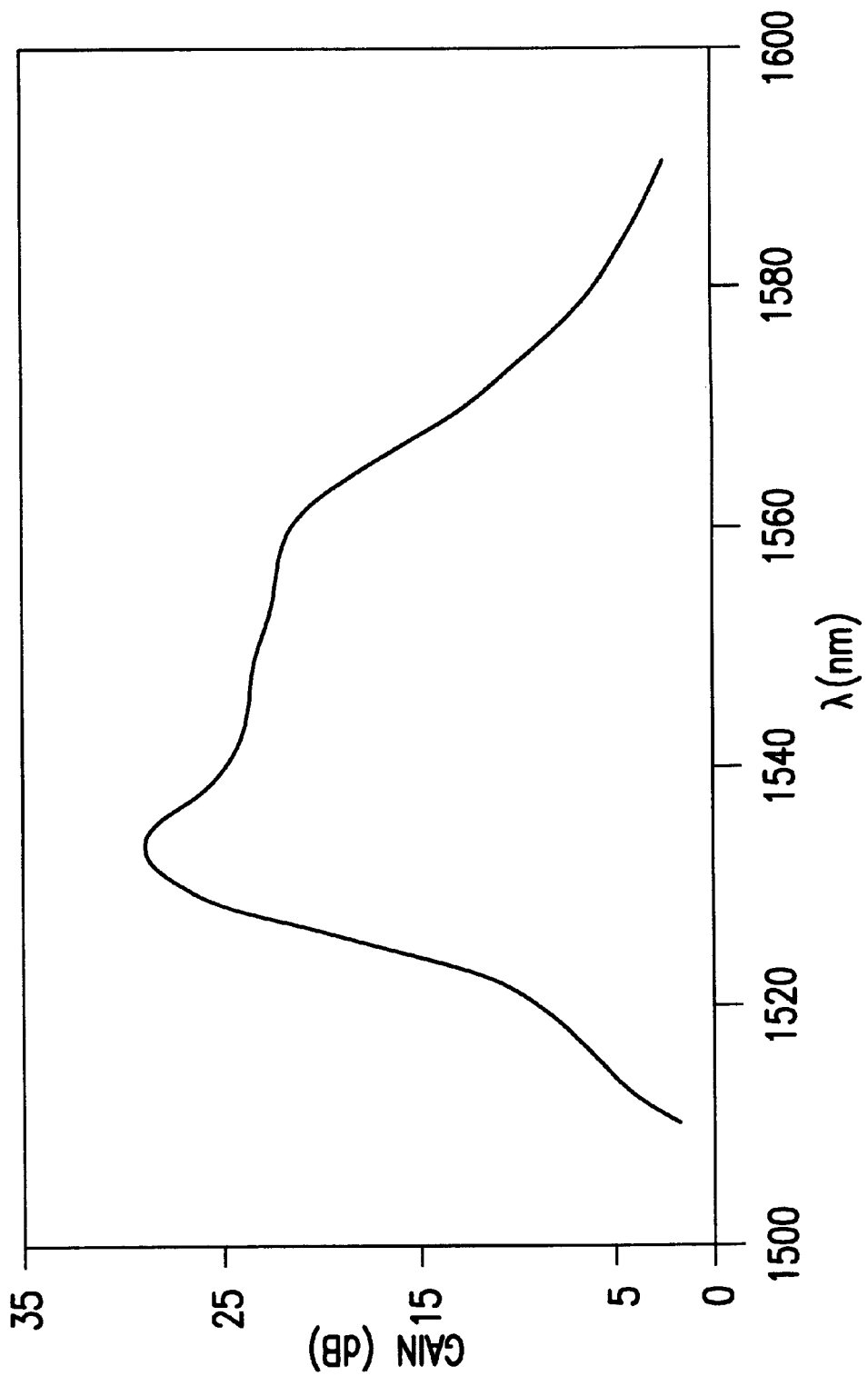
FIG. 1 shows the gain of a conventional EDFA as a function of wavelength.
Figure 2:
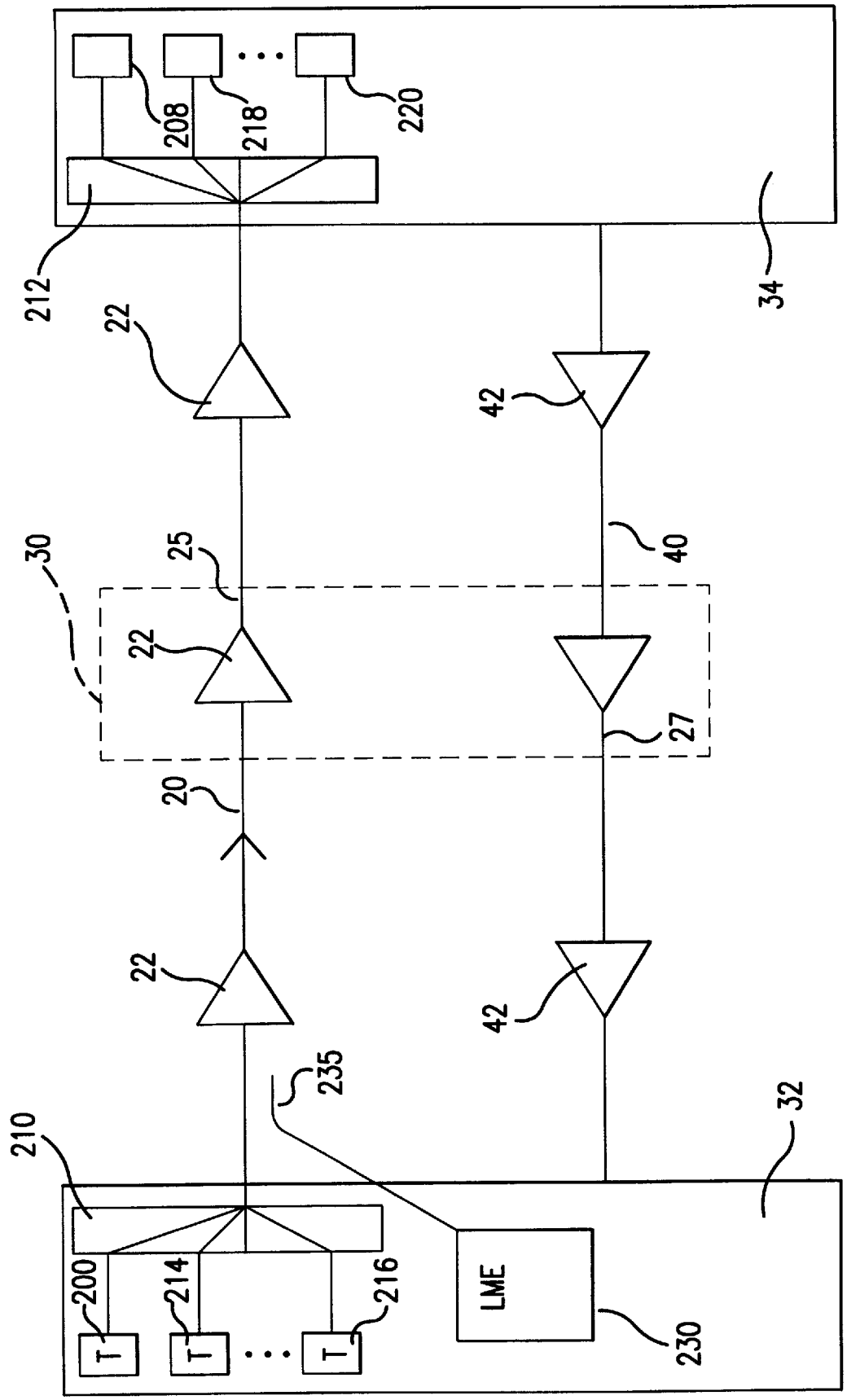
FIG. 2 shows a simplified block diagram of an optical fiber transmission system in accordance with the present invention.

Referring to FIG. 2, there is disclosed a lightwave communication system which utilizes optical fiber amplifiers. The system includes transmitter/receiver terminals 32 and 34 and optical transmission fiber paths 20 and 40 supporting bi-directional communication. A plurality of optical amplifiers 22 and 42 are interposed in the fiber paths 20 and 40 between the transmitter/receiver terminals 34 and 32. Optical amplifiers 22 and 42 contain a length of doped fiber that provides a gain medium, an energy source that pumps the fiber to provide gain, and a means of coupling the pump energy into the doped fiber without interfering with the signal being amplified. These components of the optical amplifiers will be discussed in greater detail with respect to FIG. 3.

As shown, terminal 32 includes optical communication transmitters 200, 214 and 216 to transmit optical communications channels at wavelength $\lambda 1, \lambda 2 \ldots \lambda N$, respectively. Multiplexer 210 multiplexes these signals together to form a multiplexed signal that is launched into optical fiber 20 for transmission to the receiving terminal 34. At the receiving terminal 34, demultiplexer 212 demultiplexes and routes $\lambda 1, \lambda 2 \ldots \lambda N$ to receivers 208, 218 ... 220, respectively. Of course, in a bi-directional communication system such as shown in FIG. 2, both terminals 32 and 34 serve as transmitters and receivers and hence, while not shown in FIG. 2 for purposes of clarity, each includes both transmitters and receivers.

Figure 3:
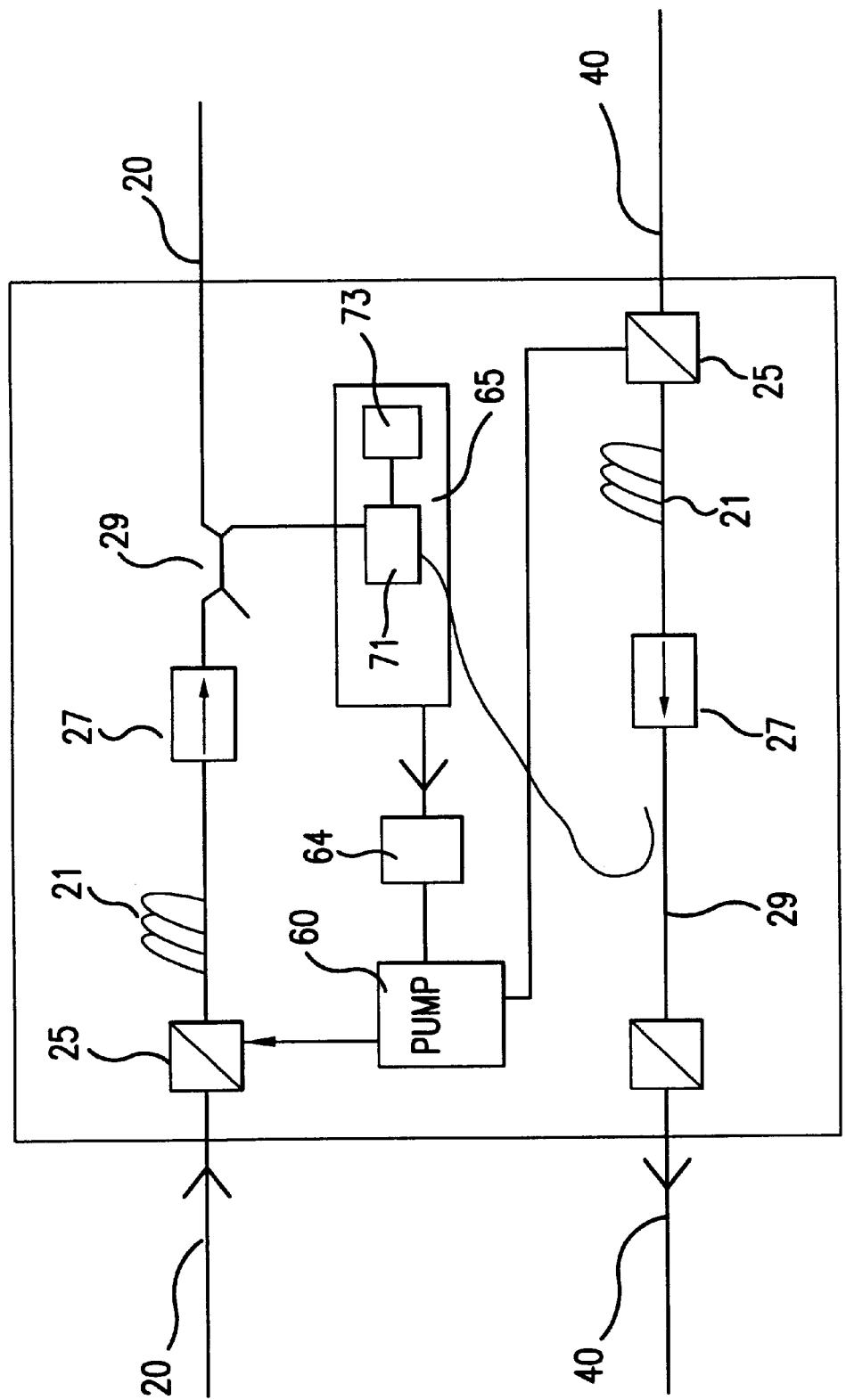
FIG. 3 shows a simplified block diagram of a rare-earth doped optical amplifier.

Referring to FIG. 3, if the optical amplifiers are selected to be rare-earth doped optical amplifiers, each includes a rare-earth doped optical fiber 21, such as an erbium doped fiber (EDF), coupled to a source of optical pump energy 60 via a coupler 25 such as a wavelength division multiplexer (WDM). An optical isolator 27 is typically located immediately downstream from each of the doped fibers. The isolator prevents amplified spontaneous emission, reflections, and Rayleigh backscattering from traveling back upstream and disrupting system stability by causing the amplifiers to oscillate.

Figure 4:
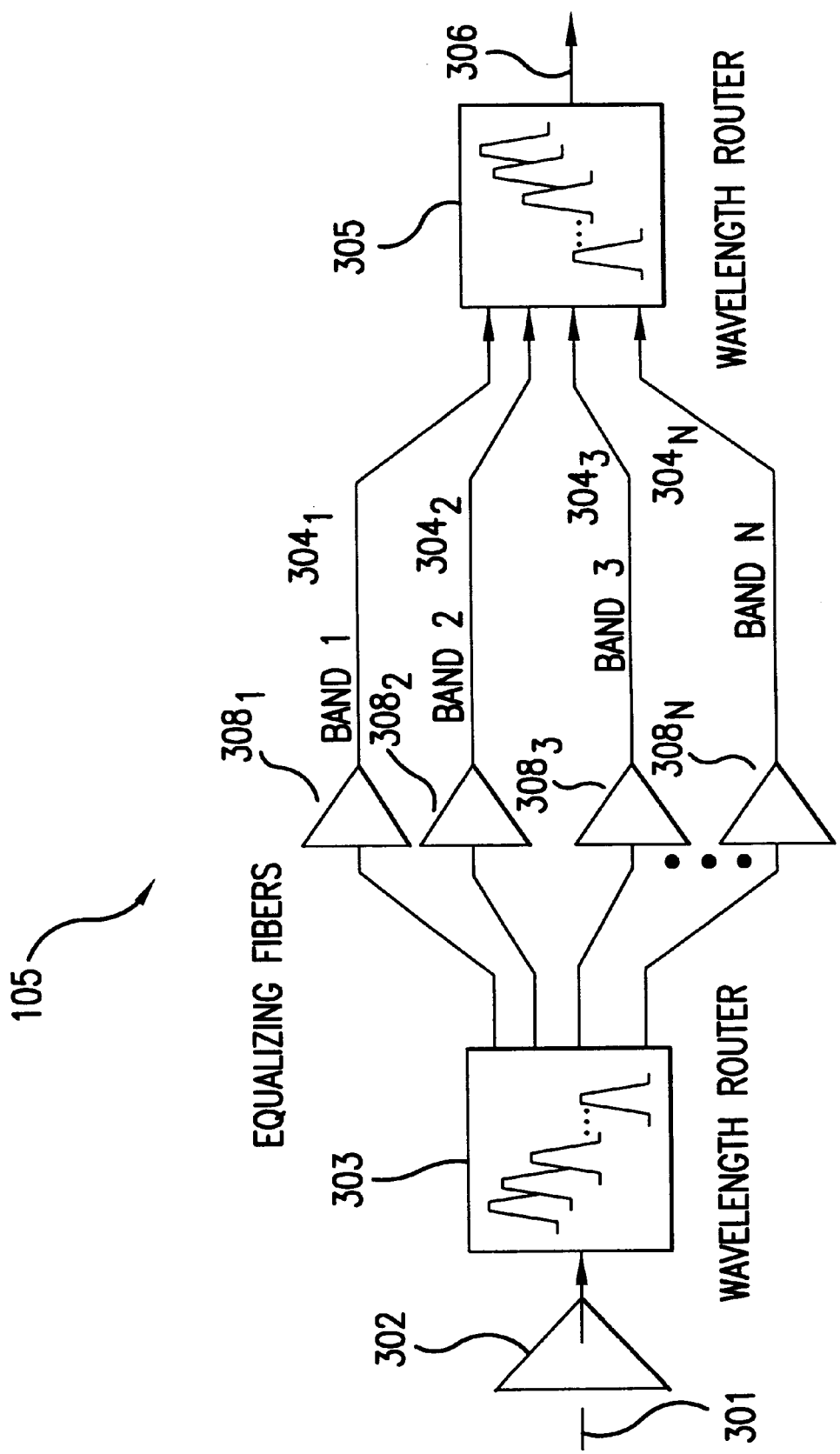
FIG. 4 shows an exemplary embodiment of the optical amplifier arrangement constructed in accordance with the present invention.

As previously mentioned, in a broadband communication system it is sometimes desirable to divide the multiplexed signal into two or more bands and then amplify each band individually with its own optical amplifier optimized for that particular band. FIG. 4 shows an example of such a multi-band amplifier arrangement. In operation, the amplifier arrangement 105 first demultiplexes the optical signal traversing the optical transmission path (e.g., paths 20 or 40 in FIG. 2) into a plurality of bands, imparts gain to each band individually, and recombines the bands onto a common path for continued transmission along the transmission path. In FIG. 4, the channels reach the amplifier arrangement on fiber path 301 and, optionally, enter an optical amplifier 302 that serves as a preamplifier. The optical channels next enter a splitter 303 such as a wavelength routing device of the type disclosed in U.S. Pat. Nos. 5,002,350 and 5,412,744 to Dragone, for example. The wavelength routing device 303 divides the incoming multiplexed signal into N output bands which are each directed to respective optical amplifiers $308_1$, $308_2, 308_3, \ldots 308_N$, which may be rare-earth doped optical amplifiers such as EDFAs. The bands are subsequently recombined in wavelength routing device 305 before exiting the amplifier arrangement on fiber 306. The gain provided by each of the optical amplifiers $308_1, 308_2, 308_3, \ldots 308_N$ is arranged to have any desired profile. In particular, the gain of the optical amplifiers is arranged to be substantially flat within each individual band and substantially equal to one another. Preamplifier 302 serves as a common amplifier for all the channels, which is used to overcome distribution and insertion losses caused by splitting the multiplexed signal into a plurality of bands.

As mentioned, the optical amplifiers $308_1, 308_2, 308_3, \ldots 308_N$ may be rare-earth doped optical amplifiers such as erbium-doped optical amplifiers. Alternatively, the amplifiers $308_1, 308_2, 308_3, \ldots 308_N$ may be Raman optical amplifiers. In the latter case the Raman gain may be generated in the fibers $304_1, 304_2, 304_3, \ldots 304_N$ in which Raman amplifiers $308_1, 308_2, 308_3, \ldots 308_N$ are respectively located.

In accordance with the present invention, preamplifier 302 is advantageously selected to be a broadband Raman amplifier. Raman amplification is accomplished by introducing the signal and pump energies along the same optical fiber. The pump and signal should be counterpropagating with respect to one another. Unlike rare-earth doped optical amplifiers, which operate on the basis of stimulated emission processes, a Raman amplifier uses stimulated Raman scattering, which occurs in silica fibers when an intense pump beam propagates through it. Stimulated Raman scattering is an inelastic scattering process in which an incident pump photon looses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength.

Raman amplifiers offer a number of advantages over rare-earth doped amplifiers. For example, they are relatively low noise devices with a gain spectrum that is very broad in comparison to rare-earth doped amplifiers. Currently, Raman amplifiers can achieve up to 100 nm without band-splitting. Also, Raman amplifiers can be used for distributed amplification. That is, the same fiber that is used for signal transmission is also used for signal amplification. In contrast to distributed amplification, rare-earth doped optical amplifiers typically used only provide lumped amplification in which gain is imparted only in a particular section of fiber that contains an appropriate dopant. Raman amplifiers, however, may also be used to provide lumped amplification. Furthermore Raman amplifiers do not rely on the presence of a special amplifier fiber since the gain medium can be the transmission fiber itself.

The use of a Raman amplifier for the preamplification stage of the amplifier arrangement offers a number of advantages over the use of a rare-earth doped preamplifier stage or even over the use of a broad-band Raman amplifier by itself to perform all the optical amplification. For example, the broad bandwidth of Raman amplifiers ensures that substantial gain will be imparted to all the multiplexed wavelengths. Even if this gain is not constant across the channels, it will be sufficient to overcome insertion and distribution losses so that the individual amplifiers can subsequently impart the precisely desired amount of gain to the individual bands. Also, the noise figure that can be obtained using a Raman preamplifier is only limited to that of the Raman amplifier itself, which can have a quantum-limited noise figure.

An important advantage of the present invention over the use of a broadband Raman amplifier by itself is that Raman pump-to-pump interactions only have to be taken into account in the preamplification stage and since flat gain operation is not needed in the pre-amplifier the design is simplified substantially. Additionally, the amplifiers used to amplify the individual bands may be independently selected from one another so that the most desirable and efficient amplifier is used for each band without having the constraints imposed by the use of a single amplifier imparting gain across the entire bandwidth of the signal.

The Raman preamplifier stage may be lumped or distributed. If a lumped Raman amplifier is used, a Raman specialty fiber, which has a large Raman gain efficiency, is inserted in the transmission path prior to the optical splitter 303 in FIG. 4. If a distributed Raman amplifier is used the portion of the transmission path prior to the optical splitter serves as the gain medium. The use of distributed amplification improves the noise performance but makes the amplifier design dependent upon the transmission fiber used. By using a lumped Raman amplifier the dependence on the transmission fiber is removed, but causes a degradation in noise performance compared to that of distributed amplifiers.

The invention claimed is:

1. An optical amplifier arrangement for use along a transmission path in an optical WDM transmission system, comprising:
    a splitter for dividing a multiplexed optical signal having a prescribed bandwidth into a plurality of distinct sub-bands;
    a plurality of output paths for respectively receiving said plurality of distinct sub-bands;
    a plurality of optical amplifiers disposed in said output paths, said optical amplifiers each having a prescribed gain shape across the bandwidth of its respective sub-band;
    a coupler for recombining said distinct sub-bands and coupling said recombined distinct sub-bands onto said optical fiber transmission path;
    an optical preamplifier coupled to an input of the splitter, said optical preamplifier being a Raman amplifier having a bandwidth substantially encompassing said prescribed bandwidth of the multiplexed optical signal.

2. The optical amplifier arrangement of claim 1 wherein said splitter is a wavelength routing device.

3. The optical amplifier arrangement of claim 2 wherein said coupler comprises a second wavelength routing device.

4. The optical amplifier arrangement of claim 1 wherein at least one of the optical amplifiers is a rare-earth doped optical amplifier.

5. The optical amplifier arrangement of claim 1 wherein each of the optical amplifiers is a rare-earth doped optical amplifier.

6. The optical amplifier arrangement of claim 1 wherein at least one of the optical amplifiers is a Raman amplifier.

7. The optical amplifier arrangement of claim 1 wherein each of the optical amplifiers is a Raman amplifier.

8. The optical amplifier arrangement of claim 4 wherein said rare-earth doped optical amplifier is doped with erbium.

9. The optical amplifier arrangement of claim 6 wherein said Raman amplifier is distributed.

10. The optical amplifier arrangement of claim 6 wherein said Raman amplifier is lumped.

11. The optical amplifier arrangement of claim 1 wherein said Raman preamplifier is distributed.

12. The optical amplifier arrangement of claim 1 wherein said Raman preamplifier is lumped.

13. The optical amplifier arrangement of claim 1 wherein said prescribed gain shape is substantially flat for each of the plurality of optical amplifiers.

14. The optical amplifier arrangement of claim 1 wherein said prescribed gain shape of each of the plurality of optical amplifiers are all substantially equal to one another.

15. The optical amplifier arrangement of claim 13 wherein said prescribed gain shape of each of the plurality of optical amplifiers are all substantially equal to one another.

16. A WDM optical transmission system, comprising:
    a transmitter and a receiver;
    an optical fiber transmission path coupling said transmitter to said receiver;
    an optical amplifier arrangement disposed at an intermediate point along said transmission path, said optical amplifier arrangement including:
    a splitter for dividing a multiplexed optical signal having a prescribed bandwidth into a plurality of distinct sub-bands;
    a plurality of output paths for respectively receiving said plurality of distinct sub-bands;
    a plurality of optical amplifiers disposed in said output paths, said optical amplifiers each having a prescribed gain shape across the bandwidth of its respective sub-band;
    a coupler for recombining said distinct sub-bands and coupling said recombined distinct sub-bands onto said optical fiber transmission path;
    an optical preamplifier coupled to an input of the splitter, said optical preamplifier being a Raman amplifier having a bandwidth substantially encompassing said prescribed bandwidth of the multiplexed optical signal.

17. The transmission system of claim 16 wherein said splitter is a wavelength routing device.

18. The transmission system of claim 17 wherein said coupler comprises a second wavelength routing device.

19. The transmission system of claim 16 wherein at least one of the optical amplifiers is a rare-earth doped optical amplifier.

20. The transmission system of claim 16 wherein each of the optical amplifiers is a rare-earth doped optical amplifier.

21. The transmission system of claim 16 wherein at least one of the optical amplifiers is a Raman amplifier.

22. The transmission system of claim 16 wherein each of the optical amplifiers is a Raman amplifier.

23. The transmission system of claim 19 wherein said rare-earth doped optical amplifier is doped with erbium.

24. The transmission system of claim 21 wherein said Raman amplifier is distributed.

25. The transmission system of claim 21 wherein said Raman amplifier is lumped.

26. The transmission system of claim 16 wherein said Raman preamplifier is distributed.

27. The transmission system of claim 16 wherein said Raman preamplifier is lumped.

28. The transmission system of claim 16 wherein said prescribed gain shape is substantially flat for each of the plurality of optical amplifiers.

29. The transmission system of claim 16 wherein said prescribed gain shape of each of the plurality of optical amplifiers are all substantially equal to one another.

30. The transmission system of claim 28 wherein said prescribed gain shape of each of the plurality of optical amplifiers are all substantially equal to one another.

31. A method for amplifying a multiplexed optical signal traveling in an optical fiber transmission path of a WDM optical communication system, said method comprising the steps of:

imparting Raman gain to a multiplexed optical signal at an intermediate point along the transmission path, said multiplexed optical signal having a prescribed bandwidth;

demultiplexing the optical signal into a plurality of distinct sub-bands after Raman gain is imparted thereto;

directing said plurality of sub-bands onto respective ones of a plurality of optical paths;

amplifying a plurality of said sub-bands propagating on said optical paths;

recombining said distinct sub-bands and directing said recombined distinct sub-bands onto said optical fiber transmission path.

32. The method of claim 31 wherein the step of demultiplexing is performed by a wavelength routing device.

33. The method of claim 32 wherein the step of recombining is performed by a second wavelength routing device.

34. The method of claim 31 wherein the amplification step is performed by a plurality of rare-earth doped optical amplifiers.

35. The method of claim 31 wherein the amplification step is performed by a plurality of Raman amplifiers.

36. The method of claim 34 wherein said rare-earth doped optical amplifiers are doped with erbium.

37. The method of claim 35 wherein said Raman amplifiers are distributed.

38. The method of claim 35 wherein said Raman amplifiers are lumped.

39. The method of claim 31 wherein the step of imparting Raman gain is performed by a distributed Raman amplifier.

40. The method of claim 31 wherein the step of imparting Raman gain is performed by a lumped Raman amplifier.

41. The method of claim 31 wherein the step of amplifying the plurality of sub-bands includes the step of amplifying each of the sub-bands with a substantially flat gain profile.

42. The method of claim 41 wherein said flat gain profiles provided to each of the sub-bands are substantially equal to one another.

* * * * *